United States Patent [19]

Noakes et al.

[11] 4,166,841

[45] Sep. 4, 1979

[54] METHOD FOR MAKING PURE BETA SILICON CARBIDE

[75] Inventors: Jack E. Noakes, Plymouth; Leslie L. Terner, West Bloomfield, both of Mich.

[73] Assignee: Ford Motor Company, Dearborn, Mich.

[21] Appl. No.: 902,306

[22] Filed: May 3, 1978

[51] Int. Cl.$^2$ .................................................. C01B 31/36
[52] U.S. Cl. .............................................................. 423/345
[58] Field of Search ............................. 423/345, 449, 439

[56] References Cited

U.S. PATENT DOCUMENTS

| | | | |
|---|---|---|---|
| 966,399 | 8/1910 | Higgins . | |
| 1,134,081 | 3/1915 | Peacock . | |
| 2,431,326 | 11/1947 | Heyroth | 423/345 X |
| 3,175,918 | 3/1965 | McGahan et al. | 423/345 |
| 3,403,008 | 9/1968 | Hamling . | |
| 3,719,452 | 3/1973 | Accountius . | |
| 3,927,181 | 12/1975 | Niimi et al. | 423/345 |
| 3,947,550 | 3/1976 | Fitchmun . | |
| 4,044,110 | 8/1977 | Noakes et al. | 423/345 X |
| 4,067,955 | 1/1978 | Noakes et al. | 423/345 |

*Primary Examiner*—Jack Cooper
*Attorney, Agent, or Firm*—William E. Johnson; Keith L. Zerschling

[57] ABSTRACT

A method is taught for making beta silicon carbide in a micro balloon structure, that is, a spherical type structure in which the beta silicon carbide forms only a thin wall of the balloon structure. If desired, the micro balloon structure, which is porous, may be crushed to form beta silicon carbide of a very finely divided size. The method is accomplished by pyrolyzing microballoon structures formed of an organic material so that the material breaks down to leave carbon behind in the microballoon structure. This carbon is reacted with silicon at an appropriate temperature to form the pure beta silicon carbide in the microballoon shape.

4 Claims, No Drawings

METHOD FOR MAKING PURE BETA SILICON CARBIDE

BACKGROUND OF THE INVENTION AND PRIOR ART STATEMENT

The process of this invention was developed in order to produce extremely pure beta silicon carbide powder of submicron size. Such finely divided material may be used in other known silicon carbide article forming processes in order to produce silicon carbide articles of high strength and purity. Such processes include extruding and injection molding of powder with suitable binder materials, as well as slip casting of the powder.

The development of various processes for making silicon carbide in different forms is typified by the prior art patents cited in a novelty study conducted on this subject matter. These patents represent the state of the art as best we know it. The patents cited included the following.

U.S. Pat. No. 966,399 discloses a process for purification of chemically inert electrometallurgical products such as carbides of silicon, boron, etc. The patent does not have any teaching relative to the formation of highly pure beta silicon carbide in a submicron size range.

U.S. Pat. No. 1,134,081 teaches a process by which silicon carbide may be manufactured. The material manufactured, however, is not a finely divided, high purity grade, of beta silicon carbide powder. It is a rather crude process for making various carbides of silicon and represents the state of the art at that time.

U.S. Pat. No. 3,403,008 is directed to a method of making metal carbide fibers of small diameter but of extended length. Example 6 of the patent shows how to make silicon carbide fibers. It shows the immersion of a rayon fiber in silicon tetrachloride liquid, a drying of that fiber so coated, and then a pyrolyzation and carborization of the product in order to produce a silicon carbide fiber. The patent does not teach a method similar to the one set forth in this application for making an extremely finely divided, high purity, beta silicon carbide powder.

U.S. Pat. No. 3,719,452 discloses in Example X thereof, a method for producing an extremely hard body of beta silicon carbide. The silicon carbide produced is not a finely divided, submicron material as is the case when the method of the present invention is followed.

U.S. Pat. No. 3,947,550 discloses a process for making a complex shaped article of silicon carbide in which some alpha silicon carbide particles are bonded together by a beta phase silicon carbide which is formed by pyrolyzing the binder used to hold the initial alpha silicon carbide particles in a particular shape and then siliciding the pyrolyzed binder. The patent does not teach a method for producing submicron size, extremely pure beta silicon carbide powder.

SUMMARY OF THE INVENTION

This invention is directed to a method of making beta silicon carbide and, more particularly, to a method of making extremely pure beta silicon carbide powder of submicron size.

In accordance with the teachings of the method of this invention, microballoon structures formed of an organic material which is heat decomposable into carbon and volatile organic matter is pyrolyzed in an inert atmosphere. The microballoon structures have a diameter in the range from 5 to 130 microns and a wall thickness in the range from 0.1 to 0.5 microns. When these structures are pyrolyzed, the organic material gives off its volatile organic matter and forms carbon. The carbon retains the microballoon structure, but the finished structure is, of course, porous. The pyrolyzed microballoon structure is mixed with a finely divided form of silicon particles. The mixture of pyrolyzed microballoon structures and the finely divided silicon particles is placed in an enclosed chamber and a vacuum is drawn on the chamber to remove oxygen therefrom. The enclosed chamber is heated to a temperature not in excess of 925° C. while the vacuum is maintained. This action volatilizes low melting impurities which may be contained in the chamber or in the silicon particles. Before heating the enclosed chamber to a temperature in excess of 925° C., a partial pressure of nitrogen is established in the chamber. This nitrogen reacts with the silicon particles upon continued heating of the chamber to form a skin of silicon nitride on the silicon particles. The enclosed chamber is heated to a temperature in the range of 1540° to 1590° C. while the nitrogen pressure is maintained. A vacuum is re-established within the enclosed chamber whereby the silicon nitride skin is removed from the silicon particles thereby permitting the silicon to vaporize into the enclosed chamber and to contact and react with the carbon of the microballoon structures to form beta silicon carbide. The beta silicon carbide microballoon structures are cooled back to room temperature. Thereafter, the microballoon structures can be crushed to form finely divided beta silicon carbide of submicron size.

In accordance with detailed teachings of this invention, we prefer to use a finely divided silicon powder which has a size less than about 50 microns. We prefer this material because it vaporizes into the enclosed chamber rapidly when the vacuum is re-established. When the vacuum is re-established, of course, the silicon nitride skin is removed from the finely divided silicon allowing it to vaporize into the atmosphere of the enclosed chamber thereby to come into contact with and react with the carbon of the microballoon structures.

If one desires, he may use the microballoon structures as they are rather than crushing them to obtain the finely divided beta silicon carbide. In this instance, the final product would be microballoons of pure beta silicon carbide in which the balloons would have a diameter in the range from 5 to 130 microns. Such balloons would, of course, be porous.

The microballoons of carbon are transformed into beta silicon carbide in a relatively short period of time. For example, the conversion reaction may be completed within a five minute time period but an extended time at the reaction temperature will not change the result, which is a 100% complete reaction.

DESCRIPTION OF SOME PREFERRED EMBODIMENTS

In order to illustrate the method of this invention, we will demonstrate how to carry out our process through several examples. Prior to the development of our process to be described herein, there were several different ways to produce beta silicon carbide. For example, vapor or gas reactions between silicon and carbon could be carried out, as well as liquid or chemical reactions or reactions in a solid state. Using any of these types of processes, it was very hard to produce a high purity beta silicon carbide powder without going through a long and sometimes difficult refining process.

In our patent application Ser. No. 619,425, entitled METHOD OF FORMING BETA SILICON CARBIDE POWDER, we dislcose a process by which coarser sized beta silicon carbide particles can be formed. This material has a particle size range between 12 and 40 microns upon normal grinding of the produced beta silicon carbide. However, it is quite difficult to produce submicron beta silicon carbide powder and it may be obtained from this starting material only by going through an extensive ball milling process which results in impurities from the ball milling operation being introduced into the particles. The purpose of the method of this invention is to make extremely high purity, beta phase silicon carbide material of submicron particle size directly without the necessity of substantial ball milling operations and extensive processing to remove impurities.

In all cases, we use high purities microballoon materials which are commercially available. The microballoon materials must be formed of an organic matter which when pyrolyzed breaks down into two components. One component is a volative organic matter which is drawn off. The second component is pure carbon which remains in the shape of the microballoon. For example, Bakelite phenolic microballoons having an average diameter of 45 microns with a range of diameters from 5 microns to 130 microns are commercially available. Other materials which are also acceptable include: Any phenolic resins or polymeric materials which can be formed to spheres and are capable of leaving carbon residue after pyrolyzation. Examples of a few of these are as follows: epoxy resin, polytoluene, polynapthylene, phenol furfural, phenolformaldehyde, polybenzimindarole, phenolic napthalenediol, terpolymer, polyphenylenes, polyvinylchloride, polyvinyliolene, chloridepolyphenyl polymer and others.

In all cases, the microballoons are pyrolyzed in an inert atmosphere so that the volative organic matter thereof is driven off thereby to leave the carbon phase in the shape of the microballoon structure. Originally, these microballoons have the diameter as stated above and that diameter will be maintained upon the pyrolyzing operation. The pyrolyses, of course, is carried out in an inert atmosphere so that the carbon is not burned up. The microballoons generally have a wall thickness in the range from 0.1 microns to 0.5 microns.

EXAMPLE 1

80 grams of finely divided silicon particles, 325 mesh sive, is mixed with 40 grams of pyrolyzed microballoons. This mixture is placed in a high purity graphite crucible and heated in a small vacuum furnace to 875° C. with a vacuum being applied. The vacuum is applied to remove oxygen from the chamber and the system is heated to this temperature to remove low melting impurities which may be contained in the chamber itself or in the finely divided silicon particles.

Before passing a temperature of 925° C. a partial pressure of nitrogen is established in the furnace. The partial pressure in this case is about 400 mm of Hg. The temperature is increased to a temperature of 1540° C. at a rate of 10° C./minute. The rate at which this heating is carried out is not important but it should not exceed more than 25° C. per minute. The nitrogen introduced into the chamber reacts with the surface of the silicon particles to form a thin skin of silicon nitride thereon to protect the particles so that they do not melt.

When the temperature of 1540° C. is reached, the nitrogen is removed from the furnace and the vacuum reestablished for a period of five minutes. This action permits the skin of silicon nitride to be removed from the silicon particles thereby allowing the silicon to vaporize into the atmosphere whereby it can come into contact with carbon of the microballoon. When the silicon contacts the carbon, it reacts therewith to form beta phase silicon carbide.

After five minutes, the nitrogen gas is allowed back into the furnace and the furnace power is turned off. The furnace and the material contained therein are allowed to cool back to room temperature. After reaching room temperature, the material is removed from the furnace and simply crushed to obtain pure beta silicon carbide of submicron particle size. The crushing may be carried out by a mortar and pestal.

EXAMPLE 2

400 grams of silicon particles, 325 mesh sive, is mixed with 200 grams of pyrolyzed microballoons. The processing described in Example 1 is applied only the reaction time is increased to ten minutes. The result is a fully converted, high purity, beta silicon carbide powder.

EXAMPLE 3

1000 grams of silicon particles, 325 mesh sive, is mixed with 500 grams of pyrolyzed microballoons. The mixture is placed in a large high purity graphite crucible and is heated in vacuum furnace as per Example 1 to a temperature of 925° C. while a vacuum is applied. At 925° C., the atmosphere is changed from vacuum to a partial pressure of nitrogen of about 200 mm of Hg. The temperature of the furnace is increased to 1590° C. and at that temperature the atmosphere is changed from nitrogen to vacuum. The vacuum is held for 15 minutes. After 15 minutes, the atmosphere is changed back to nitrogen and the furnace turned off. The resulting material is a fully converted, high purity, beta silicon carbide powder.

EXAMPLE 4

The procedure of Example 3 is followed with the exception that the reaction time is decreased to five minutes. The resulting product is a fully converted, high purity, beta silicon carbide powder.

If one desires, they may use the silicon carbide microballoons as microballoons, rather than crushing the same to obtain the submicron, high purity, beta silicon carbide powder. One could use such microballoons, for example, in impact grinding, carbide blasting, high temperature insulating, heat exchangers, protecting some liquid metals during casting from oxidation, and other purposes.

There has been disclosed herein a unique method for making high purity, finely divided, beta silicon carbide. Those skilled in the art, in view of this specification, will make modifications of this invention which fall within the true spirit and scope of this invention. It is intended that all such modifications be included within the scope of the appended claims.

We claim:

1. A method of making beta silicon carbide which comprises the steps of:

pyrolyzing in an inert atmosphere only microballoon structures formed of an organic material which is heat decomposable into carbon and volatile organic matter, said microballoon structures having a diameter in the range from 5 to 130 microns and a wall thickness in the range from 0.1 to 0.5 microns, said pyrolyzation causing said organic material to give off its volatile organic matter and form carbon with the microballoon structure remaining intact;

mixing only the pyrolyzed microballoon structures with finely divided silicon particles;

placing the mixture of pyrolyzed microballoon structures and finely divided silicon particles in an enclosed chamber;

drawing a vacuum on said enclosed chamber to remove oxygen from the enclosed chamber;

heating the enclosed chamber to a temperature in the range of 875° to 925° C. thereby to volatilize low melting impurities contained in the silicon particles and the enclosed chamber so that such impurities are removed from the enclosed chamber by operation of the vacuum;

establishing a partial pressure of nitrogen in the enclosed chamber, the nitrogen reacting with the silicon particles to form a skin of silicon nitride on the silicon particles;

heating the enclosed chamber to a temperature in the range of 1540° to 1590° C.;

re-establishing a vacuum within the enclosed chamber whereby the silicon nitride skin is removed from the silicon particles thereby permitting the silicon particles to vaporize into the enclosed chamber and to contact and react with the carbon microballoon structures to form beta silicon carbide in microballoon structures;

cooling the beta silicon carbide microballoon structures back to room temperature; and crushing the microballoon structures to form finely divided beta silicon carbide having a size equivalent to the wall thickness of the microballoons prior to crushing.

2. The method of claim 1 wherein:

the finely divided silicon particles have a size less than about 50 microns.

3. A method of making beta silicon carbide microballoon structures which comprises the steps of:

pyrolyzing in an inert atmosphere only microballoon structures formed of an organic material which is heat decomposable into carbon and volatile organic matter, said microballoon structures having a diameter in the range from 5 to 130 microns and a wall thickness in the range from 0.1 to 0.5 microns, said pyrolyzation causing said organic material to give off its volatile organic matter and form carbon with the microballoon structure remaining intact;

mixing only the pyrolyzed microballoon structures with finely divided silicon particles;

placing the mixture of pyrolyzed microballoon structures and finely divided silicon particles in an enclosed chamber;

drawing a vacuum on said enclosed chamber to remove oxygen from the enclosed chamber;

heating the enclosed chamber to a temperature in the range of 875° to 925° C. thereby to volatilize low melting impurities contained in the silicon particles so that such impurities are removed from the enclosed chamber by operation of the vacuum;

establishing a partial pressure of nitrogen in the enclosed chamber, the nitrogen reacting with the silicon particles to form a skin of silicon nitride on the silicon particles;

heating the enclosed chamber to a temperature in the range of 1540° to 1590° C.;

re-establishing a vacuum within the enclosed chamber whereby the silicon nitride skin is removed from the silicon particles thereby permitting the silicon particles to vaporize into the enclosed chamber and to contact and react with the carbon of the microballoon structures to form beta silicon carbide in microballoon structures; and cooling the beta silicon carbide microballoon structures back to room temperature.

4. The method of claim 3 wherein:

the finely divided silicon particles have a size less then about 50 microns.

* * * * *